United States Patent [19]
Maejima et al.

[11] Patent Number: 5,695,730
[45] Date of Patent: Dec. 9, 1997

[54] PROCESS FOR PREPARING SILICIC ACID HYDRATE

[75] Inventors: Kuniaki Maejima; Shigeki Yamagata; Tomohiro Banda; Masaru Kishida; Keiji Monbetsu; Tsutomu Naito, all of Tokyo, Japan

[73] Assignee: Nippon Paper Industries Co., Ltd., Tokyo, Japan

[21] Appl. No.: 531,313

[22] Filed: Sep. 20, 1995

[30] Foreign Application Priority Data

Sep. 26, 1994 [JP] Japan .................. 6-256172

[51] Int. Cl.$^6$ .................................. C01B 33/12
[52] U.S. Cl. ............... 423/339; 423/325; 502/233; 252/313.2; 252/315.6
[58] Field of Search .................. 423/325, 339; 502/233; 252/313.2, 315.6; 162/181.6

[56] References Cited

U.S. PATENT DOCUMENTS

| | | | |
|---|---|---|---|
| 4,590,052 | 5/1986 | Chevallier | 423/335 |
| 4,709,859 | 11/1987 | Chevallier | 423/339 |
| 4,790,486 | 12/1988 | Eimaeda et al. | 241/20 |
| 4,842,838 | 6/1989 | Chevallier | 423/339 |
| 5,066,420 | 11/1991 | Chevallier | 252/312.2 |
| 5,236,623 | 8/1993 | Chevallier | 252/313.2 |

FOREIGN PATENT DOCUMENTS

| | | |
|---|---|---|
| 38-17651 | 7/1963 | Japan . |
| 51-25235 | 7/1976 | Japan . |
| 52-28754 | 7/1977 | Japan . |
| 52-28755 | 7/1977 | Japan . |
| 53-80397 | 7/1978 | Japan . |
| 60-65713 | 4/1985 | Japan . |
| 61-17415 | 1/1986 | Japan . |
| 61-141767 | 6/1986 | Japan . |
| 4-55971 | 9/1992 | Japan . |
| 5-178606 | 7/1993 | Japan . |
| 5-301707 | 11/1993 | Japan . |
| 5-311599 | 11/1993 | Japan . |

*Primary Examiner*—Deborah Jones
*Assistant Examiner*—Amy M. Harding
*Attorney, Agent, or Firm*—Roylance,Abrams,Berdo & Goodman,L.L.P.

[57] ABSTRACT

The present invention provides silicic acid hydrate having a large pore volume and tiny particle diameters, and a process for preparing it. There is disclosed silicic acid hydrate obtained by neutralizing an aqueous solution of sodium silicate with a mineral acid, which has particle properties represented by an oil absorption of 250 to 350 ml/100 g, a total pore volume of 4.0 to 6.0 cc/g, an average pore radius of 200 to 400 Å, and an average pore diameter of 3.0 to 15 μm by the laser method, or 2.0 to 4.0 μm by the coulter method, or 0.5 to 3.5 μm by the centrifugal precipitation method.

5 Claims, No Drawings

PROCESS FOR PREPARING SILICIC ACID HYDRATE

BACKGROUND OF THE INVENTION

The present invention relates to silicic acid hydrate having a large pore volume and fine particle properties which is particularly preferably used, for example, as a loading material for paper. The invention also relates to a process for preparing it.

Silicic acid hydrate plays a major role as a loading material in producing high quality paper. In detail, when silicic acid hydrate is added to and dispersed in pulp during a paper making process, the resulting paper becomes lightweight, and effectively absorbs ink on the print surface without allowing strike-through of ink to the rear surface (hereinafter referred to as "non-strike through effect"). Thus, the silicic acid hydrate is positioned as one of the important additives in the paper making process. Recently, more improvement in the performance of silicic acid hydrate as a loading material for paper has been demanded to realize a higher paper quality and less consumption of pulp.

A typical method known for the commercial production of silicic acid hydrate has been the neutralization of sodium silicate with a mineral acid. Numerous proposals have been made since old days to improve this technique. For instance, Japanese Patent Publication (Kokoku) No. Sho 38-17651 discloses the two-stage addition of a mineral acid for neutralization, Japanese Patent Publication (Kokoku) No. Sho 51-25235 discloses multi-stage neutralization, and Japanese Patent Publication (Kokoku) Nos. Sho 52-28754 and Sho 52-28755 detailedly describe methods for controlling the concentrations of sodium silicate and sulfuric acid to be reacted, and the rate of addition of sulfuric acid. Japanese Laid-Open Patent Publication No. Sho 53-80397 describes a method of adding sodium sulfate to a dilution of sodium silicate, followed by performing neutralization.

The control of the reaction by these methods helped obtain silicic acid hydrates with large oil absorptions and pore volumes, thereby considerably improving the non-strike through effect of paper. However, the resulting silicic acid hydrates have relatively large particle diameters, range widely in particle size, and contain many coarse particles, thus posing problems with particle properties. Hence, measures for obtaining coarse particle-free silicic acid hydrates with fine particle properties are under energetic development.

For example, Japanese Laid-Open Patent Publication Nos. Sho 61-17415, Sho 61-141767, Hei 5-178606 and Hei 5-301707 describe methods of wet-grinding a slurry after completion of the reaction. Japanese Laid-Open Patent Publication No. Sho 60-65713 proposes a method of adding a mineral acid in two stages, wherein it is added in the first stage, and reacted with the slurry, and after the reaction, the slurry is wet-ground twice. According to these methods, the proportion of coarse particles decreases during the grinding of the slurry after the reaction, and the effect of preventing coarse particles from falling off the paper can be obtained along with the non-strike through effect.

With a method of wet-grinding the slurry after the reaction, as disclosed in Japanese Laid-Open Patent Publication No. Sho 61-141767, however, the particle size distribution of the silicic acid hydrate after grinding is biased to the fine particle side. Upon excessive grinding, the yield of the loading material into the paper would lower, and simultaneously, the high structure of the silicic acid hydrate would be destroyed, reducing the pore volume. Japanese Laid-Open Patent Publication No. Hei 5-178606 states that the ground slurry improves the performance of paper, but it is highly viscous, and thus is difficult to handle during transportation, etc., making it unsuitable for practical use. With these methods, moreover, the efficiencies of grinding are low, and the average particle diameters of the silicic acid hydrates obtained after wet grinding, determined by centrifugal precipitation, are 3 to 10 μm. In accordance with the method of Japanese Laid-Open Patent Publication No. Hei 5-301707, in particular, the average particle diameter, determined by the coulter method, was 16 to 20 μm, despite a couple of grindings, showing that sufficiently fine particles were not obtained.

SUMMARY OF THE INVENTION

We conducted extensive studies on the assumption that silicic acid hydrate having a large pore volume and extremely fine particle properties would enhance the non-strike through effect of paper as its loading material. These studies have led us to make sure that silicic acid hydrate having a pore volume and an average particle diameter within specific ranges exhibits unexpected loading material characteristics, and to facilitate relevant manufacturing techniques, accomplishing the present invention.

Therefore, the object of the present invention is to provide silicic acid hydrate having a large pore volume and a tiny particle diameter, and a process for preparing it. In particular, its object is to provide silicic acid hydrate, which imparts a high level of non-strike through effect and a high loading material yield to paper when added thereto, as well as a process for preparing it.

The silicic acid hydrate according to the present invention that attains the above-described object is silicic acid hydrate obtained by neutralizing an aqueous solution of sodium silicate with a mineral acid. It is structurally characterized by particle properties, including an oil absorption of 250 to 350 ml/100 g, a total pore volume of 4.0 to 6.0 cc/g, an average pore radius of 200 to 400 Å, an average particle diameter of 3.0 to 15 μm by the laser method, 2.0 to 4.0 μm by the coulter method, or 0.5 to 3.5 μm by the centrifugal precipitation method.

The present invention also relates to a process for preparing silicic acid hydrate by adding a mineral acid to an aqueous solution of sodium silicate to neutralize it, which comprises a first step of adding to sodium silicate with a silica concentration, as $SiO_2$, of 6 to 10% by weight a mineral acid, in an amount corresponding to 30 to 50% of the neutralization equivalent, at a temperature above 70° C. but below the boiling point of the reaction system, followed by applying a thorough wet grinding treatment with a vigorous shearing force within the aging period of time; a second step of then adding a substantial remaining amount of the mineral acid at a temperature above the temperature of the preceding step, followed by aging to precipitate nearly the total amount of silica; and a third step of further adding a mineral acid to adjust the pH of the resulting slurry to a range of 5 to 3.

DETAILED DESCRIPTION OF THE INVENTION

The properties of the silicic acid hydrate according to the present invention are expressed by values determined by the following methods:

(1) Oil absorption:

According to the method of JIS KS101 which is incorporated herein by reference (2) BET specific surface area:

Measured using 0.05 to 0.1 g of a sample of powdery silicic acid hydrate by means of Flow Sorb 2300S/N (Shimadzu Corp.) under deaeration for 30 minutes at 300° C.

(3) Total pore volume:

0.05 of a sample of powdery silicic acid hydrate is deaerated for 30 minutes under vacuum. Then, mercury is poured, and pressed into the sample at 1 to 1900 bar to determine the pore volume by means of mercury porosimeter 2000 (Calroerba). The pressure applied corresponds to a pore radius of 75000 to 39 Å.

(4) Average pore radius:

Calculated from the equation r=V/S where S is the specific surface area obtained by the measurement of the total pore volume, and V is the total pore volume.

(5) Particle size distribution:

(a) Laser method:

A sample slurry of silicic acid hydrate is added dropwise to pure water containing 0.2% by weight of the dispersant sodium hexametaphosphate to make a uniform dispersion. The dispersion is measured for particle size by means of a laser-based particle size analyzer (Microtrack 9220FRA, Nikkiso Kabushiki Kaisha).

(b) Coulter method:

Three drops of a sample slurry of silicic acid hydrate are added to 50 ml of pure water containing 0.2% by weight of sodium hexametaphosphate, and ultrasonically dispersed for 3 minutes to make a uniform dispersion. The dispersion is measured for particle size using a coulter counter (TA, Coulter Electronics).

(c) Centrifugal precipitation method:

A sample slurry of silicic acid hydrate is added dropwise to pure water containing 0.2% by weight of sodium hexametaphosphate to make the sample have a measurable concentration. The sample is measured using Micron Photosizer SKN-1000 (Seishin Kigyo) by centrifugation for portions with particle diameters of 1 μm or less and by gravitational sedimentation for portions with particle diameters of more than 1 μm.

The particle properties of the fine silicic acid hydrate according to the present invention are characterized, first of all, by a total pore volume of 4.0 to 6.0 cc/g, and an average pore radius of 200 to 400 Å. This total pore volume is at a high level in view of the fact that the silicic acid hydrate obtained by a conventional method of wet grinding the slurry after completion of the reaction generally has a total pore volume of 4 cc/g or less. Such a large total pore volume ensures a porous structure. Because of this advantage, when the silicic acid hydrate is used as a loading material for paper, it works effectively to enable the paper to absorb ink efficiently. If the total pore volume is less than 4.0 cc/g, the absorbing capacity will be insufficient, and the non-strike through effect ineffective. If it is more than 6.0 cc/g, other characteristics will be impaired.

The total pore volume is related to the radii of pores distributed in the tissue. Practically, fine pores with a pore radius of less than 100 Å are always full of adsorption equilibrium water, and thus fail to serve for adsorption. The pores with a radius in excess of $10^4$ Å have a decreased adsorbing capacity and do not contribute to adsorptivity. The silicic acid hydrate of the present invention, having a total pore volume of 4.0 to 6.0 cc/g, has an average pore radius of about 100 to 400 Å (the intermediate pore radius for 50% of the pore volume is 1500 to 3500 Å), meaning superiority in adsorptivity over conventional silicic acid hydrates. Thus, the silicic acid hydrate of the invention is preferred for various uses (to be described later), including a loading material for paper.

The second requirement for the particle properties in the present invention is that the average particle diameter of the fine silicic acid hydrate be 3.0 to 15 μm by the laser method, 2.0 to 4.0 μm by the coulter method, or 0.5 to 3.5 μm by the centrifugal precipitation method. The reason why the particle diameter of the silicic acid hydrate shows different measurements according to the laser method, coulter method, and centrifugal precipitation method may be that the silicic acid particles are porous and strongly hydrated.

As described above, the silicic acid hydrate of the present invention is characterized by being fine particles compared with conventional ones, and tends to show particularly low values when measured by the centrifugal precipitation method. The reason for the laser method giving relatively high measured values is that the particles less than 1 μm in diameter tend to appear transparent and evade detection. The laser method is thus meaningful for evaluating the particle diameter of relatively large secondary particles. Furthermore, the silicic acid hydrate of the present invention is characterized by having an oil absorption of 250 to 350 ml/100 g, in addition to the foregoing particle properties. This value is relatively greater than those of conventional silicic acid hydrates. This characteristic is one of the preferred characteristics as a loading material for paper.

The silicic acid hydrate of the present invention possessing the above-described particle properties is produced by a process for preparing silicic acid hydrate by adding a mineral acid to an aqueous solution of sodium silicate to neutralize it, which comprises a first step of adding to sodium silicate with a silica concentration, as $SiO_2$, of 6 to 10% by weight a mineral acid, in an amount corresponding to 30 to 50% of the neutralization equivalent, at a temperature above 70° C. but below the boiling point of the reaction system, followed by applying a thorough wet grinding treatment with a vigorous shearing force within the aging period of time; a second step of then adding a substantial remaining amount of the mineral acid at a temperature above the temperature of the preceding step, followed by aging to precipitate nearly the total amount of silica; and a third step of further adding a mineral acid to adjust the pH of the resulting slurry to a range of 5 to 3.

The first step is to heat an aqueous solution of sodium silicate at an adjusted concentration, add a mineral acid at a first stage, and wet grind and age the mixture. The solution of sodium silicate is preferably at an $SiO_2/Na_2O$ molar ratio of 2.9–3.4, and its silica concentration needs to be set at 6 to 10% by weight. At a silica concentration exceeding 10% by weight, uniform agitation will become impossible during viscosity rising at the first step, failing to obtain silica with satisfactory particle properties. At a low concentration less than 6% by weight, the efficiency of production will lower. The sodium silicate solution at the adjusted concentration is heated at a temperature in the range of from 70° C. to below the boiling point of the solution. At a temperature lower than 70° C., the precipitation rate of silica will slow, requiring a long time for completing the first-stage reaction.

The mineral acid preferably used for the neutralization reaction is sulfuric acid. The concentration of sulfuric acid is not restricted, but too low a concentration will thin the reaction system, and make the volume too large. This is not suitable for commercial purposes. Highly concentrated (98%) sulfuric acid, if fully mixable at the site of addition, will generate much heat, and can be used favorably in terms of energy. The amount of the mineral acid added at the first step is set at an amount corresponding to 35 to 50% of the neutralization equivalent for the sodium silicate. This range of amount concerns the structural properties of the silicic acid hydrate. At values less than 35% or more than 50%, the highly structural properties of silica precipitated will be impaired, and the silicic acid hydrate used as a loading material for paper will deteriorate in the non-strike through effect and the yield. The time required for addition is advantageously a relatively short period of 5 to 20 minutes, and it is preferred to complete the addition before silica precipitation. The higher the temperature and the silica concentration and the larger the amount of the mineral acid added, the shorter the time for silica to be precipitated. Thus, it is desirable to regulate the rate of addition in harmony with those conditions. The addition within 5 minutes will result in the insufficient construction of a uniform reaction system.

The operating requirement of particular importance at the first step is to apply, besides the above-described reaction conditions, a thorough wet grinding with a vigorous shearing force promptly after the addition of the mineral acid. The wet grinding may show a grinding effect even after silica precipitation subsequent to the addition of the mineral acid. However, it is preferably initiated when or immediately before silica starts to precipitate. Our studies have demonstrated that grinding at the start of precipitation is effective. Therefore, grinding proceeds simultaneously with the aging treatment carried out after the addition of the mineral acid. This stage in the prior art was called an aging procedure, designed only to continue ordinary agitation under heat for a predetermined period of time, thereby promoting the precipitation of silica. In the present invention, the progress of aging and the simultaneous execution of thorough wet grinding bring the reaction system to an extremely uniform state, and markedly improve the grinding efficiency, thus producing favorable particles. The aging time varies with the temperature, and it is 2 to 3 hours at 80° C., and 1 to 2 hours at 90° C. Wet grinding is complete within the aging time, and is not performed at the second or later steps. Hence, aging at this step is performed during the thorough grinding treatment after partial neutralization.

The thorough wet grinding as used herein refers to a procedure for minimizing the agglomeration of the resulting silica particles by using a grinding machine or a dispersing machine which can exert a vigorous shearing force. Depending on the grinder used, therefore, it is desirable to perform a grinding treatment repeatedly throughout the aging time. The silica particles formed at this step (degree of dispersion) particularly preferably have an average particle diameter by the coulter method of 2.0 to 1.0 µm.

Examples of the grinding machine used for wet grinding include ball mills in a broad sense, such as ball mills or rod mills; medium-agitated grinders, such as tower mills, attritors, satory mills, sand grinders or annular mills; and high speed rotary grinders, such as colloid mills, homomixers and in-line mills. The silica particles precipitated in the present invention are very fine, and silica precipitated at the first step, in particular, is subject to grinding. Since it can be ground by a dispersing machine or an emulsifying machine as well as the above grinder, such a machine may be used in combination with the grinder.

The second step is to add a substantial remaining amount of the mineral acid as a second-stage additive at a temperature above the temperature of the preceding step, while maintaining the slurry temperature at 80° C. to below the boiling point of the solution, to precipitate nearly the total amount of silica and enhance the joining of the silica particles precipitated at the first step. That is, the rate of neutralization with the mineral acid at this step is preferably controlled such that the cumulative sum of the neutralization rate obtained by the first-stage addition of the mineral acid and that by the second-stage addition of the mineral acid will be 80 to 95%. This second-stage addition takes about 15 to 30 minutes. After the addition, aging is preferably performed for a while under ordinary agitation in order to complete the reaction.

The particle diameter of the final silicic acid hydrate after the second step is, to our surprise, substantially equal to that after completion of the first step. The fact that no change occurs in the particle diameter after the second step means that the nucleation, particle growth, particle agglomeration, and control of the agglomerate diameter by thorough wet grinding, performed at the first step, and the enhanced binding among the agglomerated particles at the second step proceed smoothly, thereby synthesizing a highly structural silicic acid hydrate having the aforementioned properties. Hence, no grinding treatment is performed at the second or later step; otherwise, the highly structural silica tissue formed would be destroyed. At the first step, the viscosity of the slurry is high, but at the second or later step, the slurry viscosity lowers to about one-fifth, thus facilitating the handling of the product.

The third step is to further add a mineral acid subsequently to the second step, adjusting the pH of the slurry to a range of 5 to 3. The addition of the mineral acid at this stage should preferably be performed slowly over the course of about 30 to 60 minutes. This is because the alkali component included in the silicic acid hydrate comes out, causing the pH to return, and changes in this pH range are marked. Thus, the difference in operation between the second step and the third step is only in the rate of addition of the mineral acid, and the other conditions are substantially the same. The use of low concentration sulfuric acid is recommendable to adjust the pH accurately. The addition of the mineral acid at this stage is exclusively designed for adjusting the pH of the reaction system, and the reaction has substantially been complete in the preceding step. Therefore, its amount added is usually up to 20%, and preferably about 5%, of the neutralization equivalent. In terms of operation, the addition is an intermittent, slow addition compared with the preceding step.

The silicic acid hydrate obtained in the third step may contain sodium sulfate as a by-product, and thus should preferably be filtered, washed with water, and repulped.

The silicic acid hydrate of the present invention possesses a high level of porous structure with a total pore volume of 4.0 to 6.0 cc/g and an average pore radius of 200 to 400 Å, and has a tiny size expressed by an average pore diameter of 3.0 to 15 µm by the laser method, 2.0 to 4.0 µm by the coulter method, or 0.5 to 3.5 µm by the centrifugal precipitation method. Particularly when used as a loading material for paper, it imparts to the paper a light weight, excellent non-strike through effect, and a high yield of loading material. In most cases, therefore, it has characteristic particle properties represented by relatively high values, including a specific surface area of 100 to 200 $m^2/g$ and an oil absorption of 250 to 350 ml/100 g.

As noted above, the fact that the silicic acid hydrate of the present invention possesses a highly structural silica tissue is the very proof that it has the aforementioned particle properties physically. That is, as will be seen in the embodiments to follow, the structure-related properties, such as total pore volume, average pore radius, BET specific surface area and oil absorption, are virtually determined by the neutralization at the first step. The method of reducing the particle diameter while retaining this structural feature is based on the grinding treatment at the first stage. Applying grinding at the second or later step would involve structural changes, as will be understood from decreases in the pore volume or the oil absorption. Ordinary hydrated silica is an agglomerate of relatively large agglomerated particles, which does not show the above-described physical properties and can be distinguished easily. The silicic acid hydrate of the present invention, particularly when used as a loading material for paper, effectively catches the component of ink penetrating from the surface of the paper during printing, owing to its highly structural fine particles. Accordingly, its use as a paper loading material enables paper to be lightweight and show excellent non-strike through effect. Furthermore, it exhibits the unprecedented effect of imparting a high yield of loading material, despite its small average particle diameter.

According to the manufacturing process of the present invention, silicic acid hydrate is obtained by adding a mineral acid to a solution of sodium silicate to cause a neutralization reaction. In this process, silica precipitated at the stage of partial neutralization reaction in the first step is promptly subjected to thorough wet grinding and simultaneous aging, whereby a vigorous shearing force acts to form a slurry of dispersed silica made of agglomerated particles having a controlled particle diameter. At the second step, neutralization with the mineral acid in an amount corresponding to a substantial remainder of the neutralization equivalent is performed under ordinary agitation at a temperature above the temperature of the preceding step, with simultaneous aging. By such treatment, the resulting silica exerts a binder-like action, and more strongly binds together the primary particles among the agglomerated particles formed at the preceding step. As a result, the clusters are stabilized to form highly uniform porous particles, i.e., highly structural hydrated silica. The third step is a stage for pH adjustment, where a small amount of a mineral acid is added slowly for neutralization to dealkalize the resulting silicic acid hydrate. Thus, the manufacturing process of the present invention adopts a unique divided neutralization method, thereby making it possible to produce silicic acid hydrate having characteristic physical properties efficiently on a commercial scale.

Because of the above-described characteristic particle properties, the silicic acid hydrate of the present invention can be expected to show utility not only as a loading material for paper, but as a filler for plastics, an anti-blocking agent for films, a filler or a flatting agent for cosmetics and paints, a filler for rubber, or a carrier for agrochemicals.

EXAMPLES

The present invention is further illustrated by the non-limiting examples below in comparison with controls. The percentages and parts are by weight, unless otherwise specified. The properties of the resulting silicic acid hydrate were measured using Mercury Porosimeter 2000 (Calroerba) for the total pore volume, Microtrack 9220FRA (Nikkiso) for the average particle diameter by the laser method, Coulter Counter TAII (Coulter Electronics) for the average particle diameter by the coulter method, and Microphotosizer SKN-1000 (Seishin Kigyo) for the average particle diameter by the centrifugal precipitation method. The non-strike through effect and the yield of the loading material were measured as follows:

Non-strike through effect

A pulp slurry at a mixing ratio of NYKP:TMP:GP:DIP= 20:30:20:30 was used as a starting material for paper. A loading material slurry obtained in each of the Examples below was incorporated as a loading material into the pulp slurry, and the mixture was made into paper weighing 40 g/m$^2$ and an ash content of 2% by an orienting paper machine (Kumagaya Riki Kogyo). The paper was dewatered by a press, and dried with a cylinder dryer to prepare a sheet sample. The sheet sample was subjected to single-sided printing using a newspaper ink for keyless offset printing (New King VANTEAN Chinese Ink, Toyo Ink Mfg. Co., Ltd.). The printed sample was allowed to stand for 24 hours in an atmosphere at 20° C. and 65% RH, and then the reflectance of the rear surface, the opposite side to the printed surface, was measured by a Macbeth reflection densitometer. The strike-through value (post-printing opacity) was calculated from the following equation:

Strike-through value=(reflectance of the rear surface of the printed sample/reflectance of the rear surface of the unprinted sample)×100 (%).

The non-strike through effect was defined as an increase from the strike-through value of the sheet sample prepared by adding the loading material slurry of Control 1.

Yield of loading material

The ash content of the paper measured by JIS P8128 was divided by the proportion of the loading material slurry added during sheet making.

Example 1

(1) First step

In a reactor, commercially available No. 3 sodium silicate (SiO$_2$: 20.0%, Na$_2$O: 9.5%) was diluted with water to prepare a diluted solution of sodium silicate containing 6.7% of SiO$_2$. The sodium silicate solution was heated to 90° C., and sulfuric acid (concentration: 95%) in an amount corresponding to 40% of the neutralization equivalent was added over 7 minutes under agitation sufficiently vigorous to cause no occurrence of a coarse gel. The liquor after the addition of sulfuric acid was transparent, showing no solids. After completion of the addition, the resulting partially neutralized liquid was transferred into a mixer of a high speed rotating grinder type. In the transferred liquid, much silica precipitated, forming a slurry. Grinding was performed for 2 minutes. After grinding, the slurry was returned to the reactor, the temperature was raised again to 90° C., and the system was kept agitated for 2 hours for aging. A trace amount of the slurry after aging was taken, and measured for the particle diameter by the coulter method.

(2) Second step

Then, the slurry temperature was raised to 95° C., and sulfuric acid of the same concentration as in the first step was added over 15 minutes to reach 85% of the neutralization equivalent, followed by 15 minutes of aging.

(3) Third step

Subsequently, 1N sulfuric acid was added to the aged slurry over 30 minutes to adjust the pH of the slurry to 4.5.

(4) Performance evaluation

The slurry after completion of the third step was filtered, washed with water, and repulped into pure water to recover a slurry of silicic acid hydrate. The resulting slurry was evaluated for the non-strike through effect of paper and the yield of the loading material therein. Furthermore, the slurry was filtered, dried, and measured for the total pore volume, the average pore radius, the BET specific surface area, and the oil absorption. The results are shown in Table 1 in comparison with the varying conditions applied.

Control 1

A slurry of silicic acid hydrate was produced under the same conditions as in Example 1, except that the grinding treatment of the first step was not performed. The resulting slurry was measured and evaluated for physical properties in the same manner as in Example 1. The results are revealed in Table 1.

Example 2

A slurry of silicic acid hydrate was produced under the same conditions as in Example 1, except that the grinding treatment of the first step was performed for 120 minutes using a ball mill, and aging was carried out for hour. The resulting slurry was measured and evaluated for physical properties in the same manner as in Example 1. The results are revealed in Table 1.

Control 2

A slurry of silicic acid hydrate was produced under the same conditions as in Example 2, except that the grinding treatment of the first step was not performed, but instead, the slurry after completion of the third step was ground for 30 minutes by a ball mill. The resulting slurry was measured and evaluated for physical properties in the same manner as in Example 1. The results are revealed in Table 1.

Example 3

The grinding treatment at the first step of Example 1 was performed for 2 hours, with the mixture being circulated at a rate of 5 liters per minute, by means of an in-line mill of a high speed rotating grinder type. The mixture was transparent at the start of grinding, but began to precipitate silica in about 5 minutes, appearing slurry. During grinding, the slurry temperature was kept at 90° C. to effect grinding and aging simultaneously. Except these conditions, the same procedure as in Example 1 was performed to produce a slurry of silicic acid hydrate. The resulting slurry was measured and evaluated for physical properties in the same manner as in Example 1. The results are shown in Table 1.

Example 4

The grinding treatment at the first step of Example 1 was performed for 2 hours, with the mixture being circulated at a rate of 7 liters per minute, by means of an attritor of a medium-agitated grinding type. The mixture was transparent at the start of grinding, but began to show silica precipitation in about 5 minutes, appearing slurry. During grinding, the slurry temperature was kept at 90° C. to effect grinding and aging simultaneously. Except these conditions, the same procedure as in Example 1 was performed to produce a slurry of silicic acid hydrate. The resulting slurry was measured and evaluated for physical properties in the same manner as in Example 1. The results are shown in Table 2.

Example 5

The grinding treatment at the first step of Example 1 was performed for 2 hours, with the mixture being circulated at a rate of 7 liters per minute, by means of a sand grinder of a medium-agitated grinding type. The mixture was transparent at the start of grinding, but began to show silica precipitation in about 5 minutes, appearing slurry. During grinding, the slurry temperature was kept at 90° C. to effect grinding and aging simultaneously. Except these conditions, the same procedure as in Example 1 was performed to produce a slurry of silicic acid hydrate. The resulting slurry was measured and evaluated for physical properties in the same manner as in Example 1. The results are shown in Table 2.

Control 3

A slurry of silicic acid hydrate was produced in the same manner as in Example 5, except that the grinding treatment was performed continuously in all steps, the first, second and third steps. The resulting slurry was measured and evaluated for physical properties in the same manner as in Example 1. The results are shown in Table 2.

Example 6

A slurry of silicic acid hydrate was produced in the same manner as in Example 1, except that at the first step, the temperature of the diluted solution of sodium silicate was set at 80° C. and the grinding treatment was performed for 3 hours using a sand grinder. The resulting slurry was measured and evaluated for physical properties in the same manner as in Example 1. The results are shown in Table 2.

TABLE 1

| | Item/No. | | | | |
|---|---|---|---|---|---|
| | Ex. 1 | Cont. 1 | Ex. 2 | Cont. 2 | Ex. 3 |
| [Conditions] | | | | | |
| Step for grinding | 1st | None | 1st | After 3rd | 1st |
| Grinder | Mixer | None | Ball mill | Ball mill | In-line mill |
| Neutralization rate at 1st step (%) | 40 | 40 | 40 | 40 | 40 |
| Average particle diameter after 1st step (coulter method) (μm) | 3.75 | 7.66 | 3.71 | 6.83 | 3.00 |
| [Properties measured] | | | | | |
| Average particle diameter (μm) | | | | | |
| (1) Laser method | 14.03 | 31.83 | 13.88 | 13.90 | 10.24 |
| (2) Coulter method | 3.89 | 5.69 | 3.85 | 4.01 | 3.07 |
| (3) Centrifugal precipitation method | 3.1 | 8.9 | 3.0 | 3.0 | 1.8 |
| Total pore volume (cc/g) | 5.56 | 4.83 | 5.06 | 3.25 | 4.61 |
| Average pore radius (Å) | 320 | 320 | 327 | 278 | 307 |
| BET specific surface area (m²/g) | 170 | 162 | 158 | 128 | 161 |
| Oil absorption (ml/100 g) | 306 | 306 | 298 | 212 | 308 |
| [Performance evaluation] | | | | | |
| Non-strike through effect | +4.6 | (Reference) | +2.8 | −0.1 | +3.5 |
| Yield of loading material (%) | 51.5 | 50.8 | 50.0 | 4.6 | 46.9 |

TABLE 2

| | Ex. 4 | Ex. 5 | Cont. 3 | Ex. 2 |
|---|---|---|---|---|
| [Conditions] | | | | |
| Step for grinding | 1st | 1st | All steps | 1st |
| Grinder | Attritor | Sand grinder | Sand grinder | Sand grinder |
| Neutralization rate at 1st step (%) | 40 | 40 | 40 | 40 |
| Average particle diameter after 1st step (coulter method) (μm) | 3.32 | 2.61 | 2.58 | 2.52 |
| [Properties measured] | | | | |
| Average particle diameter (μm) | | | | |
| (1) Laser method | 8.95 | 6.36 | 4.38 | 4.87 |
| (2) Coulter method | 3.22 | 2.79 | 2.10 | 2.67 |
| (3) Centrifugal precipitation method | 1.7 | 1.2 | 0.7 | 0.8 |
| Total pore volume (cc/g) | 4.75 | 4.41 | 3.34 | 4.41 |
| Average pore radius (Å) | 290 | 333 | 143 | 335 |
| BET specific surface area (m²/g) | 197 | 145 | 266 | 155 |
| Oil absorption (ml/100 g) | 304 | 288 | 232 | 286 |
| [Performance evaluation] | | | | |
| Non-strike through effect | +2.7 | +5.0 | +0.5 | +3.5 |
| Yield of loading material (%) | 51.5 | 45.4 | 32.0 | 43.4 |

The results of Tables 1 and 2 show that the silicic acid hydrates of the Examples fulfilling the requirements for the total pore volume and average pore diameter of the present invention were all excellent in the non-strike through effect, and at a high level in terms of the yield of the loading material, in comparison with Control 1 serving as the reference. In Control 1 applying no wet grinding at the first step, by contrast, the average particle diameters measured by the respective methods were larger than the upper limits of the present invention; hence, the yield of the loading material was satisfactory, but the non-strike through effect was poor. Control 2 applied a wet grinding treatment after the third step, so that the total pore volume was small, and both the non-strike through effect and the yield of loading material markedly declined. Control 3 performed wet grinding at all steps, but the total pore volume decreased, and the non-strike through effect and the yield of loading material were lower than in the Examples. In Examples 1 to 6, pores measuring 100 Å or less accounted for about 2% of the total pore volume.

Controls 4 and 5

Slurries of silicic acid hydrate were produced under the same conditions as in Example 1, except that at the first step of Example 1, the amount of sulfuric acid as a first-stage additive (rate of neutralization) to the sodium silicate solution was varied. Each of the resulting slurries was measured and evaluated for physical properties in the same manner as in Example 1. The results are revealed in Table 3, as contrasted with the rate of neutralization.

TABLE 3

| | Cont. 4 | Cont. 5 |
|---|---|---|
| [Conditions] | | |
| Step for grinding | 1st | 1st |
| Grinder | Sand grinder | Sand grinder |
| Neutralization rate at 1st step (%) | 25 | 55 |
| Average particle diameter after 1st step (coulter method) (μm) | 2.00 | 2.98 |
| [Properties measured] | | |
| Average particle diameter (μm) | | |
| (1) Laser method | 14.26 | 8.07 |
| (2) Coulter method | 3.99 | 3.03 |
| (3) Centrifugal precipitation method | 3.45 | 1.0 |
| Total pore volume (cc/g) | 2.10 | 4.40 |
| Average pore radius (Å) | 150 | 156 |
| BET specific surface area (m²/g) | 145 | 260 |
| Oil absorption (ml/100 g) | 210 | 288 |
| [Performance evaluation] | | |
| Non-strike through effect | −0.5 | +0.5 |
| Yield of loading material (%) | 45.5 | 39.0 |

The results of Table 3 show that Control 4 with a neutralization rate of 25% and Control 5 with a neutralization rate of 55% failed to involve the precipitation of highly structural silica, and thus encountered marked decreases in the non-strike through effect and the yield of the loading material. In Control 5, pores measuring 100 Å or less accounted for about 14% of the total pore volume.

As described above, the present invention provides silicic acid hydrate which has a large pore volume and fine particle properties, and which, when used as a loading material for paper, is excellent in the non-strike through effect and the yield of the loading material. A manufacturing process in accordance with the present invention enables this paper-loading silicic acid hydrate with high performance to be commercially produced efficiently. Thus, the silicic acid hydrate and the process for preparing it contribute greatly to the paper industry. The silicic acid hydrate of the present invention is useful not only as a loading material for paper, but as a filler for plastics, an anti-blocking agent for films, a filler or a flatting agent for cosmetics and paints, a filler for rubber, or a carrier for agrochemicals.

What is claimed is:

1. Silicic acid hydrate obtained by neutralizing an aqueous solution of sodium silicate with a mineral acid, which has particle properties represented by an oil absorption of 250 to 350 ml/100 g, a total pore volume of 4.0 to 6.0 cc/g, an average pore radius of 200 to 400 Å, and an average particle diameter of 3.0 to 15 μm by the laser method, or 2.0 to 4.0 μm by the coulter method, or 0.5 to 3.5 μm by the centrifugal precipitation method.

2. A process for preparing silicic acid hydrate by a stepwise addition of mineral acid to an aqueous solution of sodium silicate whereby the sodium silicate is neutralized, said process comprising:

(A) adding mineral acid to an aqueous solution of sodium silicate having a silica concentration as $SiO_2$ of 6 to 10% by weight, wherein said mineral acid in added in an amount corresponding to 30 to 50% of the neutralization equivalent, to form a partially neutralized aqueous solution and wherein the temperature is maintained above 70° C. but below the boiling point of the partially neutralized aqueous solution;

(B) simultaneously wet grinding and aging the partially neutralized aqueous solution of (A) to form a slurry;

(C) adding mineral acid to the slurry of (B) wherein said mineral acid is added in an amount such that the sum of acid added in steps (A) and (C) corresponds to about 80–95% of the neutralization equivalent, and wherein the temperature of the slurry is above the temperature of step (A);

(D) aging the slurry resulting from (C) to precipitate silica such that neutralization is substantially complete;

(E) adding mineral acid to the slurry resulting from (D) to adjust the pH to 3 to 5.

3. The process of claim 2 wherein the wet grinding treatment within the aging time at step (B) is performed until the average particle diameter of the silicic acid hydrate reaches 2.0 to 4.0 µm as measured by the coulter method.

4. The process of claim 2 for preparing silicic acid hydrate, which process further comprises filtering, washing with water, and repulping the slurry of silicic acid hydrate obtained by step (E).

5. A slurry useful as loading material in a paper-making process said slurry comprising a silicic acid hydrate obtained by neutralizing an aqueous solution of sodium silicate with a mineral acid, which has particle properties represented by an oil absorption of 250 to 350 mL/100 g, a total pore volume of 4.0 to 6.0 cc/g, an average pore radius of 200 to 400 Å, and an average particle diameter of 3.0 to 15 µm by the laser method, or 2.0 to 4.0 µm by the coulter method, or 0.5 to 3.5 µm by the centrifugal precipitation method.

* * * * *